UNITED STATES PATENT OFFICE.

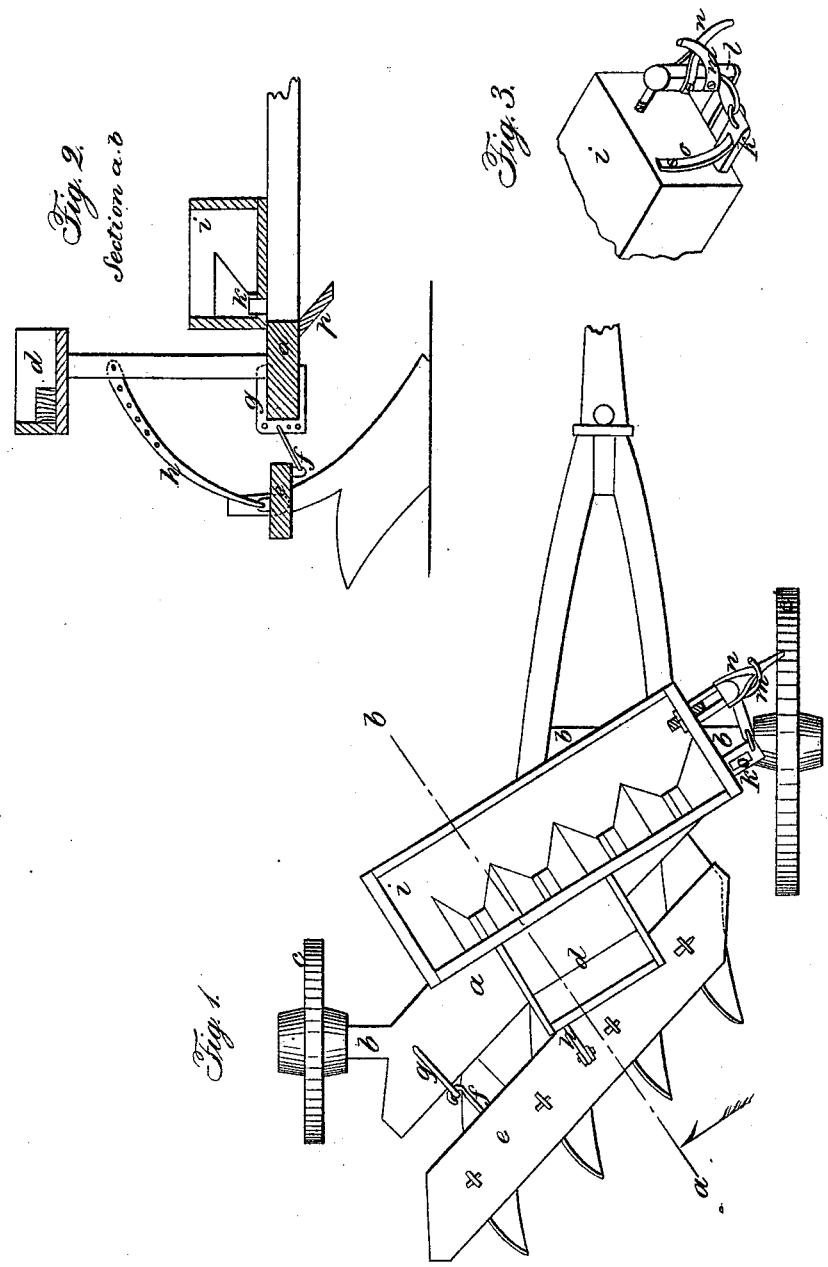

NATHAN BAKER, OF FLOWERFIELD, MICHIGAN.

IMPROVEMENT IN CULTIVATORS.

Specification forming part of Letters Patent No. 5,715, dated August 15, 1848.

*To all whom it may concern:*

Be it known that I, NATHAN BAKER, of the town of Flowerfield, St. Joseph county, and State of Michigan, have made certain new and useful Improvements in Gang-Plows, connecting therewith a seeding apparatus, to be used when desired; and I do hereby declare that the following is a full, clear, and exact description of their nature and construction, reference being had to the accompanying drawings, making part of this specification, in which—

Figure 1 is a plan, with the seeder in place; Fig. 2, a cross-section at the line $ab$ of Fig. 1, and Fig. 3 part of the seeder separate.

The same letters indicate like parts in all the figures.

The nature of my improvements consists, first, in arranging the wheels that support the machine diagonally to the main frame, and at the same time running parallel with each other, the off wheel being made larger and placed some distance in front of the other, so that when the machine is in operation (the off wheel being in the furrow) the carriage is brought parallel with the surface of the ground, causing no strain on the animals' necks, while the wheels govern the plows in any kind of ground, and support a great portion of the weight of the furrow while turning it; and my second improvement consists in combining therewith a seeding apparatus which can be used when required, and removed again when the machine is required for breaking up fallow, the seeder being made to distribute the grain by the spokes of the off wheel acting on a lever connected with a slide at one end of the seeder.

The construction is as follows:

The carriage is composed of a tongue, hounds, and a main frame-piece, $a$, at each end of which projects an axle, $b$, on which the wheels $c\ c'$ revolve. These axles project diagonally from the main frame-piece $a$, as shown in the drawings, Fig. 1, and the right-hand wheel, $c'$, is made somewhat larger, so that when the machine is in operation this wheel turns in the furrow in which the off horse travels, if it be intended to cut all the ground. The off wheel, $c'$, is placed about four (4) feet in advance of the other, and each wheel governs the depth of the plow next to it, equalizing the whole, so as to leave uneven land in a much better condition than by any other plow.

On the frame-piece $a$ are two standards, near the center of the machine, which serve as supports for a seat, $d$, on which the driver sits.

Just behind the frame-piece $a$ a large beam, $e$, is situated, to which are attached three or more mold-boards, the number to be varied according to the amount of power used. Bolted to this beam are two or more iron hooks, $f$, that hook into pieces of iron $g$, firmly secured to the main frame $a$. These pieces of iron are provided with holes into which the hooks are inserted, so as to allow the beam to be raised or lowered, as may be required, to plow deep or shallow.

When it is desired to transport the machine to a different part of the field it is necessary that the beam $e$, to which the mold-boards are attached, should be raised clear from the ground and held in that position. To effect this purpose I connect a curved brace, $h$, with the top of the beam $e$, about the center, and the upper end is provided with holes, and secured by a bolt to one of the standards which support the seat, and by the turning of this brace up the beam and mold-boards are raised from the ground, and the machine can be carried to any place required.

Connected with the machine is a seeding apparatus, which I will now describe. This consists of an oblong box, $i$, which, when in use, is placed on the hounds and main frame-piece $a$, just in front of the driver's seat. The bottom of this box is provided with any number of openings for the grain to pass out, and over them is placed a slide, $k$, provided also with openings, the right-hand end of which projects out a little distance, and is attached by a hook, or otherwise, to a standard, $l$, the lower end of which is stepped in a piece of iron projecting out from the bottom of the box, and the upper end turns in a loose joint connected with the top of the box. At the lower end of the standard $l$ an arm, $m$, turns up, which supports a kind of lever, $n$, against which the spokes of the right-hand wheel, $c'$, bear when in operation, and thus draw out the slide. The slide is immediately brought back upon the release of the lever $n$ from each of the spokes by a spring, $o$, fastened to that end of the box and bearing on the slide.

To regulate the quantity of grain to be sown I generally have two or more slides always on hand, with different-sized holes in each of them—the drawing out of one and inserting another requiring but a moment's time.

The inside of the box is divided off into partitions with angular sides, to conduct the grain down to the opening in the slide and bottom of the box. Just underneath the box and hounds, which connect with the tongue, is placed an inclined board, *p*, connected to the frame-piece *a*, upon which the grain falls as it leaves the openings in the bottom of the box and is scattered.

Having thus fully described the nature and construction of my improvements, what I claim as new therein, and desire to secure by Letters Patent, is—

The manner of arranging the wheels diagonally to the carriage or main frame, for the purposes herein specified and made known.

NATHAN BAKER.

Witnesses:
   J. H. SHARP,
   E. BAKER.